US011292420B2

(12) United States Patent
Choi et al.

(10) Patent No.: US 11,292,420 B2
(45) Date of Patent: Apr. 5, 2022

(54) INFLATABLE AIRBAG ASSEMBLIES FOR A UTILITY COMPONENT-EQUIPPED VEHICLE SEATING POSITION

(71) Applicant: Autoliv ASP, Inc., Ogden, UT (US)

(72) Inventors: Changsoo Choi, Rochester, MI (US); Harry Park, Rochester Hill, MI (US); Vinay Genthikatti, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 85 days.

(21) Appl. No.: 16/597,653

(22) Filed: Oct. 9, 2019

(65) Prior Publication Data

US 2021/0107426 A1 Apr. 15, 2021

(51) Int. Cl.
*B60R 21/207* (2006.01)
*B60R 21/2338* (2011.01)
*B60R 21/215* (2011.01)
*B60R 21/20* (2011.01)
*B60R 21/262* (2011.01)
(Continued)

(52) U.S. Cl.
CPC .......... *B60R 21/2338* (2013.01); *B60R 21/20* (2013.01); *B60R 21/207* (2013.01); *B60R 21/262* (2013.01); *B60R 21/215* (2013.01); *B60R 21/237* (2013.01); *B60R 2021/0032* (2013.01); *B60R 2021/23382* (2013.01)

(58) Field of Classification Search
CPC ........ B60N 3/001; B60N 3/002; B60N 3/004; B60N 3/005; B60N 3/007; B60N 2/79; B60N 2/793; B60N 2/797; B60R 21/207; B60R 21/2338; B60R 21/20; B60R 21/215; B60R 21/237; B60R 21/00; B60R 21/231; B60R 2021/0032; B60R 2021/23382; B60R 2021/0004; B60R 2021/161; B64D 11/06205; B64D 11/0619; B64D 11/0638; B64D 11/0646; A47B 31/06

USPC ..................... 280/728.2, 728.1, 730.1, 743.1
See application file for complete search history.

(56) References Cited

U.S. PATENT DOCUMENTS

| 5,492,361 A | 2/1996 | Kim |
| 9,656,625 B2 | 5/2017 | Jung et al. |
| 9,669,793 B2 | 6/2017 | Jung et al. |
| (Continued) | | |

FOREIGN PATENT DOCUMENTS

| DE | 102012221533 | 5/2014 | | |
| DE | 102017128097 A1 * | 5/2019 | ............. | B60N 3/002 |
| JP | 2005125944 | 5/2005 | | |

OTHER PUBLICATIONS

RD 592019 (Research Disclosure); Jul. 3, 2013.*
International Search Report and Written Opinion dated Nov. 23, 2020 for international application PCT/US2020/054807.

*Primary Examiner* — Keith J Frisby
(74) *Attorney, Agent, or Firm* — Stoel Rives LLP (57) ABSTRACT

Inflatable airbag assemblies and methods are disclosed for a vehicle seating position having a utility component or occupant accessory that at least partially extends over a seat of the vehicle seating position. The utility component/occupant accessory may be stowable, and may be adjustable upward-downward, fore-aft, rotationally, etc. The utility component/occupant accessory may house an inflatable airbag cushion of the inflatable airbag assembly, which may deploy in a collision event so as to be disposed between the utility component/occupant accessory and the vehicle seating position.

18 Claims, 10 Drawing Sheets

(51) Int. Cl.
*B60R 21/237* (2006.01)
*B60R 21/00* (2006.01)

(56) References Cited

U.S. PATENT DOCUMENTS

| | | |
|---|---|---|
| 10,232,815 B1 | 3/2019 | Dry |
| 2018/0244234 A1* | 8/2018 | Anae .................... B60R 21/206 |
| 2018/0281724 A1 | 10/2018 | Nagasawa |
| 2019/0092264 A1 | 3/2019 | Spahn et al. |
| 2019/0111877 A1 | 4/2019 | Line et al. |
| 2019/0118755 A1 | 4/2019 | Dry et al. |
| 2020/0094770 A1* | 3/2020 | Fischer ................ B60R 21/231 |
| 2020/0122670 A1* | 4/2020 | Jung .................... B60R 21/207 |

* cited by examiner

INFLATABLE AIRBAG ASSEMBLIES FOR A UTILITY COMPONENT-EQUIPPED VEHICLE SEATING POSITION

TECHNICAL FIELD

The present disclosure relates generally to the field of automotive protective systems. More specifically, the present disclosure relates to an inflatable airbag assembly to deploy from a utility component disposed at a vehicle seating position.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Automotive safety devices, such as inflatable airbag assemblies, are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position.

As used herein, the terms "dashboard" and "instrument panel" refer to a region of a vehicle disposed forward of a motor vehicle occupant, and may include instrumentation, controls, a glove box, etc.

The term "opposite" is a relational term used herein to refer to a placement of a particular feature or component corresponding to another related feature or component wherein the corresponding features are components are positionally juxtaposed to each other. By way of example, a person's right hand is opposite the person's left hand.

Inflatable airbag assemblies are widely used to reduce or minimize occupant injury during a collision event. An inflatable airbag cushion of an inflatable airbag assembly used in a vehicle should perform reliably, predictably, and in a repeatable manner. Although vehicle surfaces that may support or interact with an inflatable airbag cushion may vary from vehicle model to model, it is desirable that the inflatable airbag cushion be able to perform in a consistent, repeatable manner.

During installation, inflatable airbag systems or assemblies are typically disposed at an interior of a housing in a packaged state (e.g., are rolled, folded, and/or otherwise compressed) or a compact configuration and may be retained in the packaged state behind a cover. A housing may be a component of an inflatable airbag assembly that contains at least a portion an inflatable airbag cushion of the inflatable airbag assembly. The housing may, in some instances, contain one or more of the inflatable airbag cushions (or a portion thereof), an inflator, inflator plumbing, sensors, and other components for the inflatable airbag assembly. The housing, as used herein, comprises a door or closable aperture to secure in place those components disposed within the housing, at least until such time as the inflatable airbag cushion deploys. The door or closable aperture may open by virtue of force exerted against the door or closable aperture as the inflatable airbag cushion begins to inflate, or by an electrical/electronic mechanism to open the door or closable aperture. A housing may be a component provided by a manufacturer of an inflatable airbag assembly, or the housing may be a component provided by a manufacturer of a vehicle, or the function of a housing may be served by a structure of a vehicle that is to receive the inflatable airbag assembly.

During a collision event, an inflator is initiated or otherwise triggered, which rapidly fills the airbag with inflation gas. The airbag can rapidly transition from a packaged state (e.g., a compact configuration) to a deployed state or an expanded configuration. The inflator may be triggered by an initiator that may be triggered by any suitable device or system, and the triggering may be in response to and/or influenced by one or more vehicle sensors.

Continued development in the automotive industry has resulted in vehicle designs incorporating utility components such as a foldable/stowable writing surface or electronic display (or combination of such), etc. In some cases, these utility components may be disposed forward of a vehicle seating position and interposed between the vehicle seating position and previously typical locations where an inflatable airbag system or assembly may be housed (e.g., at a dashboard/instrument panel). Mechanically interposed utility components may call for airbag assemblies that may be agnostic to, or particularly conformed to, such an interposed utility component.

Some embodiments disclosed herein can provide improved positioning, cushioning, and/or safety to occupants involved in particular types of collisions. For example, some embodiments can be configured to cushion a vehicle operator and/or front seat passengers seated adjacent to the passenger-side door. Examples of types of collisions in which certain embodiments may prove advantageous include one or more of (1) collisions where the struck object fails to engage the structural longitudinal components and/or engine block of the occupant's vehicle, (2) collisions wherein the impact forces act primarily outside of either the left or right longitudinal beams of the occupant's vehicle, (3) collisions classified under the Collision Deformation Classification scheme as FLEE or FREE, (4) front-impact collisions wherein the occupant's vehicle strikes no more than 25% of the vehicle width, (5) collisions as specified for the Insurance Institute for Highway Safety ("IIHS") small overlap frontal crash test, or (6) collisions as specified for the National Highway Traffic Safety Administration ("NHTSA") oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version VI) (July 2017), and Saunders, J., Craig, M. and Parent, D., "Movable Deformable Barrier Test Procedure for Evaluating Small Overlap/Oblique Crashes," *SAE Int. J. Commer. Veh.* 5(1): 172-195:2012, doi: 10.4271/2012-01-0577. As used herein, the term "oblique" when used to describe a collision (crash, impact, etc.) is intended to encompass any of the foregoing described collisions and any other collision in which an occupant's direction of travel as a result of the impact includes both a forward direction or component and a lateral direction or component. In the present disclosure, the longitudinal component of an occupant's post-collision trajectory during or after an oblique collision may be oriented in the vehicle-forward direction.

Figure 1A:
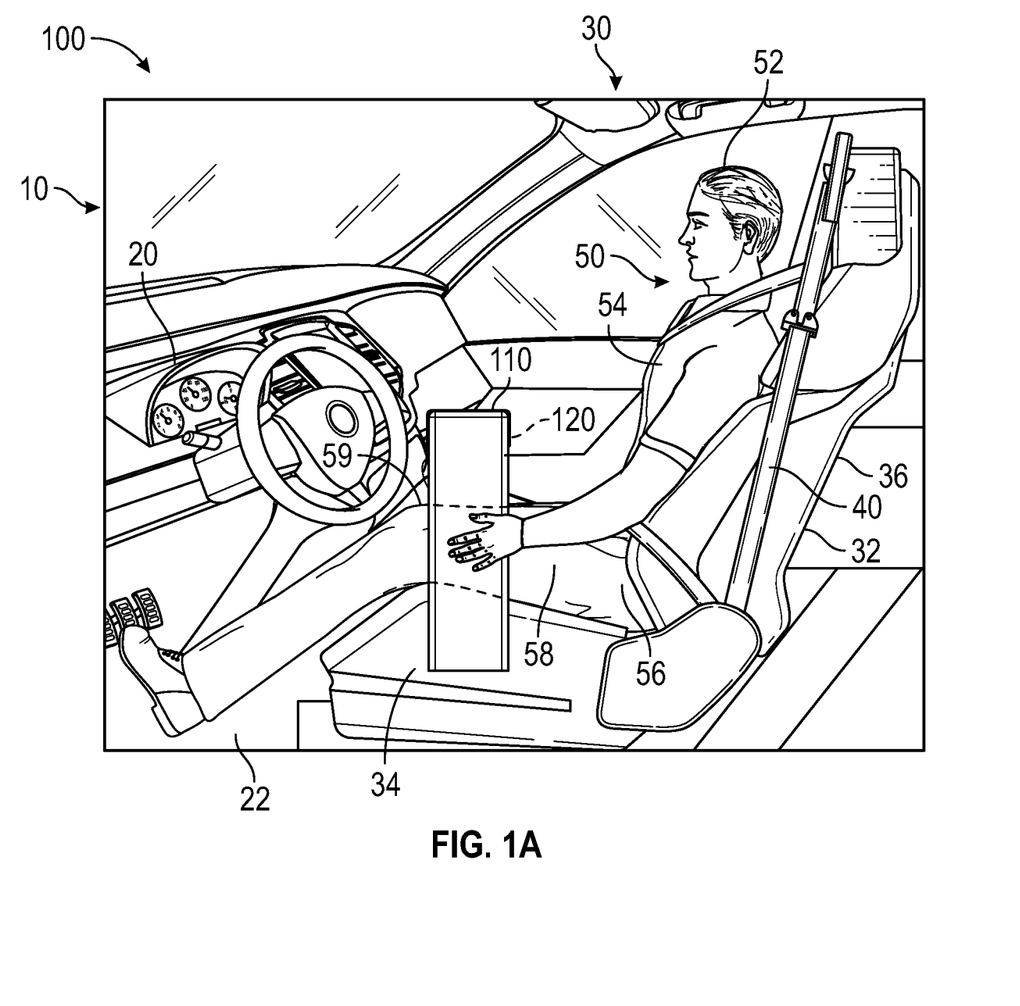
FIG. 1A is a side view of a portion of a vehicle having an inflatable airbag assembly, according to an embodiment of the present disclosure.

FIG. 1A is a side view of a portion of a vehicle 10 having an inflatable airbag assembly 100, according to an embodiment of the present disclosure. The inflatable airbag assembly 100 (also referred to herein as simply airbag assembly) is in an undeployed state. An occupant 50 is shown occupying a seat 32 of a vehicle seating position 30. A head 52, a torso 54, a pelvic region 56, and thighs 58 and knees 59 of the occupant 50 are identified. Furthermore, the occupant 50 is restrained by a safety harness 40. The vehicle seating position 30 comprises the seat 32, a seat base 34, and a seatback 36. A dashboard/instrument panel (dashboard/IP) 20 is shown for reference. A footwell 22 is below the dashboard/IP 20 and forward of the vehicle seating position 30. A utility component 110 is disposed forward of at least a portion of the occupant 50 and the vehicle seating position 30, and aft of the dashboard/IP 20. In other words, the utility component 110 is disposed between the occupant 50 and the dashboard/IP 20. More particularly, the utility component 110 is partially disposed over the vehicle seating position 30. The utility component 110 may be stowable or adjustable, or both stowable and adjustable. The utility component of the present disclosure may be disposed at a vehicle seating position, and between a seat and another feature or component forward of the vehicle seating position, such as a dashboard/IP or another vehicle seating position.

In the embodiment of FIG. 1A, the utility component 110 may be coupled at or to the seat base 34 such that a portion of the utility component 110 is partially disposed over the vehicle seating position 30. As will be apparent to one of ordinary skill in the art, the utility component 110 is constructed and mounted to withstand such energies and forces as may be produced during a collision event in any embodiment of the present disclosure. In some embodiments, the utility component 110 may provide or otherwise comprise a housing 120 for the inflatable airbag assembly 100. More particularly, the utility component 110 may serve as the housing 120 for an inflatable airbag cushion (see, e.g., inflatable airbag cushion 130 in FIGS. 3, 4, et seq.). In another embodiment, the housing 120 may be provided by a manufacturer of the inflatable airbag assembly 100 to be disposed within a portion of the utility component 110. In one embodiment, the housing 120 may be provided by a manufacturer of the vehicle 10 to receive the inflatable airbag assembly 100 and to dispose the inflatable airbag assembly 100 at the utility component 110.

Figure 1B:
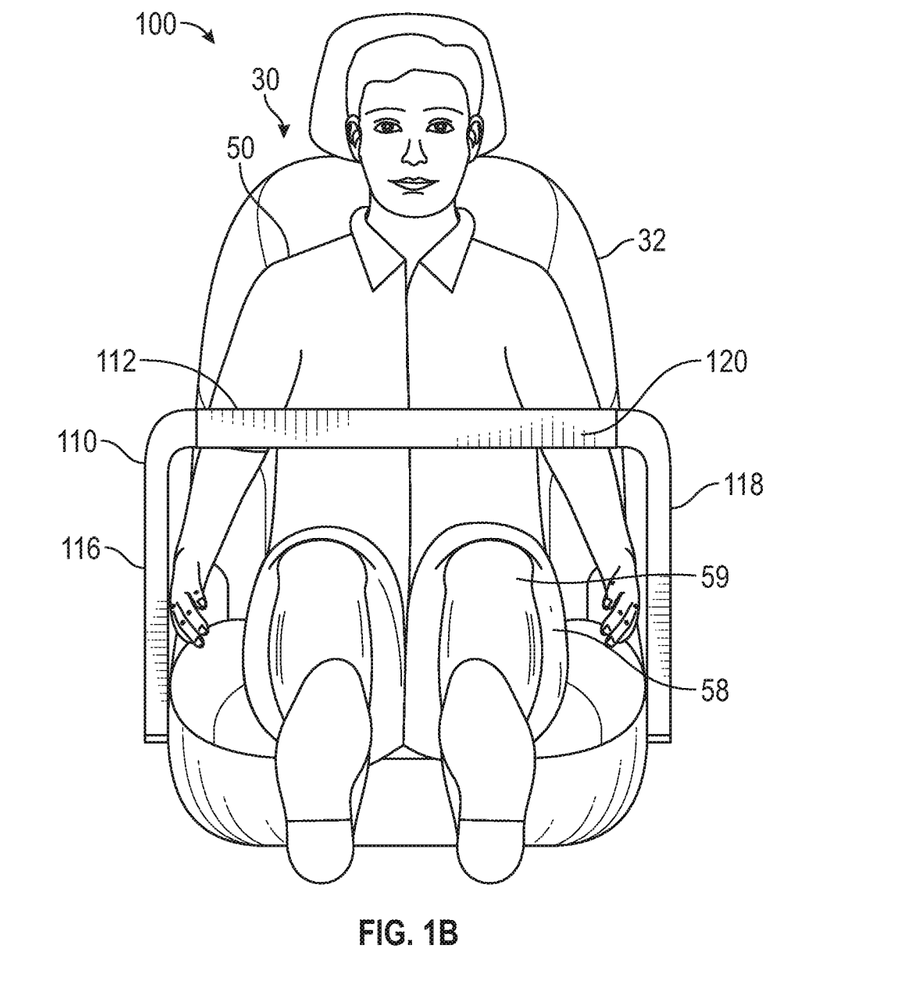
FIG. 1B is a front view of the inflatable airbag assembly of FIG. 1A, in an undeployed state.

FIG. 1B is a front view of the inflatable airbag assembly 100 of FIG. 1A, in an undeployed state. The occupant 50 and vehicle seating position 30 are shown for reference. The utility component 110 is disposed at least partially over the seat 32 and over at least a portion of the thighs 58 and/or knees 59 (hereafter, also thighs/knees 58, 59) of the occupant 50. At least a portion of the utility component 110 is disposed lateral to the thighs/knees 58, 59 of the occupant 50. The utility component 110 comprises a lateral member 112, a first support member 116, and a second support member 118. The lateral member 112 may serve as the housing 120 for the inflatable airbag assembly 100, or a distinct housing 120 may be coupled to or within the lateral member 112.

Figure 2:
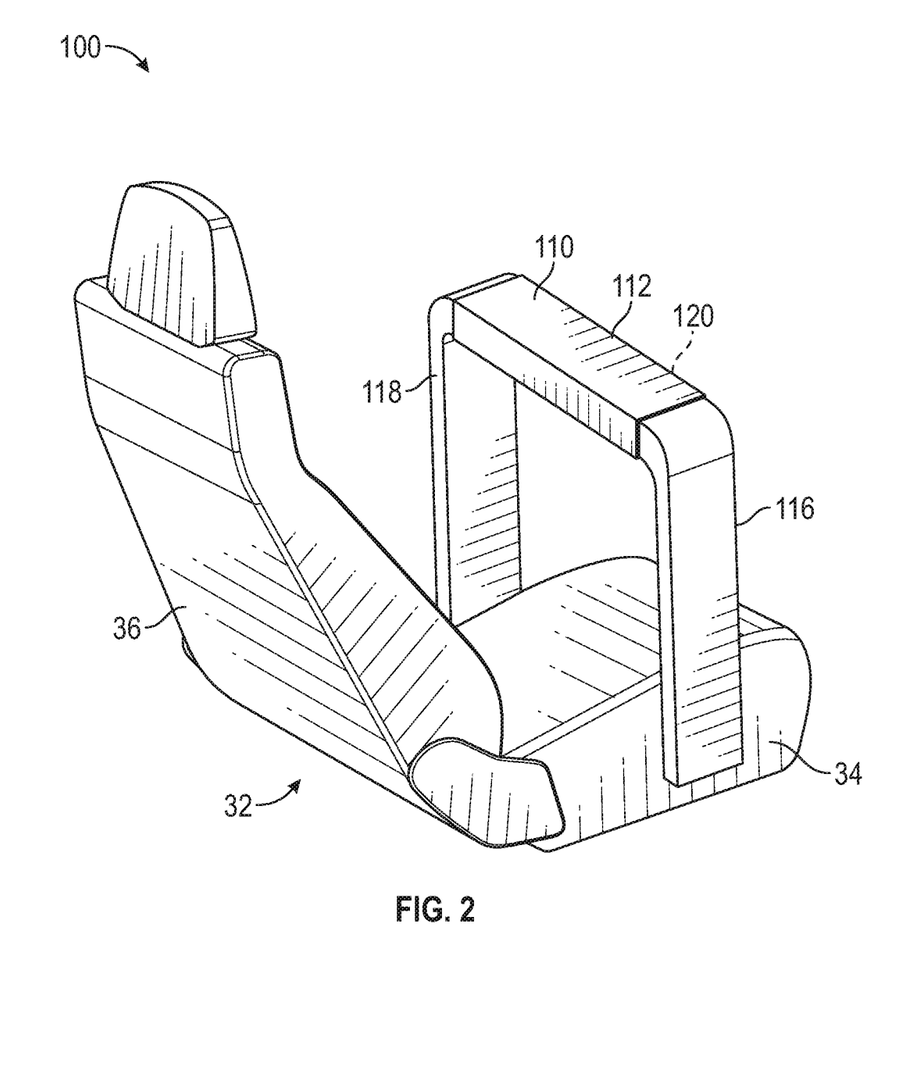
FIG. 2 is a rear perspective view of the inflatable airbag assembly of FIGS. 1A and 1B, in an undeployed state.

FIG. 2 is a rear perspective view of the inflatable airbag assembly 100 of FIGS. 1A and 1B, with the inflatable airbag assembly 100 in an undeployed state. The seat 32, seat base 34 and seatback 36 of the vehicle seating position 30 are shown for reference.

The lateral member 112 may comprise a work surface, an electronic display (e.g., a computer display), etc. A bottom surface of the lateral member 112 may comprise a cover that may open upon deployment of the inflatable airbag assembly 100. The lateral member 112 may have a greater longitudinal dimension (relative to the vehicle, see, e.g., the vehicle 10 in FIG. 1A) than shown in order to support, e.g., a laptop computer, tablet computing device, writing tablet, etc., or to accommodate an incorporated electronic display.

The utility component 110 may further comprise controls to allow an occupant (see, e.g., the occupant 50 in FIGS. 1A, 1B) to interact with an incorporated electronic display, comfort controls for the particular vehicle seating position 30, etc. In at least one embodiment of the present disclosure, the lateral member 112 of the utility component 110 may comprise a display such as, e.g., a computer display, an entertainment system interface, etc. In one embodiment, the lateral member 112 of the utility component 110 may comprise a folding display. In one embodiment, the lateral member 112 of the utility component 110 may comprise a table or tray. In at least one embodiment, the lateral member 112 of the utility component 110 may be tiltable toward the vehicle seating position 30.

Figure 3:
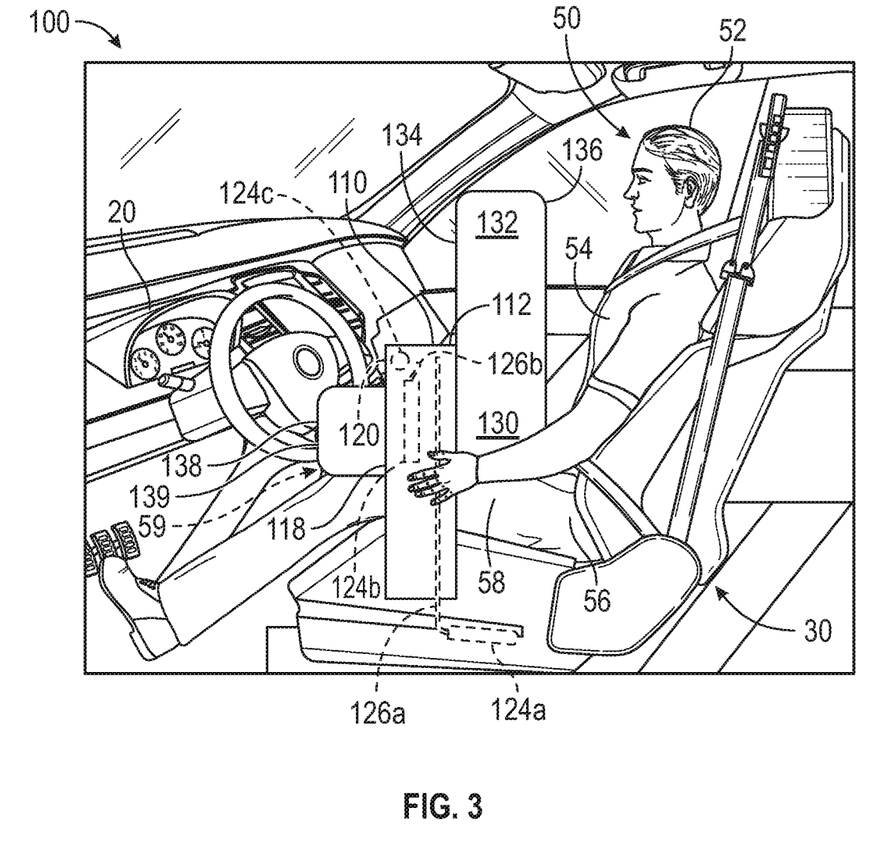
FIG. 3 is a side view of the inflatable airbag assembly of FIGS. 1A-1B and 2, with the inflatable airbag cushion in an at least partially deployed state.

FIG. 3 is a side view of the inflatable airbag assembly 100 of FIGS. 1A-1B and 2, with the inflatable airbag assembly 100 in an at least partially deployed state. The vehicle seating position 30 is shown for reference, with the occupant 50 occupying the vehicle seating position 30. The inflatable airbag assembly 100 comprises an inflatable airbag cushion 130. The inflatable airbag cushion 130 is configured to deploy from the utility component 110. The inflatable airbag cushion 130 may deploy initially downward (e.g., to exit the lateral member 112) and then rearward and upward.

The inflatable airbag assembly 100 may comprise one or more sensors (not shown) to ensure that the inflatable airbag cushion 130 deploys only under appropriate conditions. For example, the inflatable airbag assembly 100 may be configured to prevent deployment if a sensor indicates one or more the following conditions: the vehicle seating position 30 is not occupied by an occupant 50; the vehicle seating position 30 is occupied by an occupant 50 below a threshold weight; the utility component 110 is not secured in a particular position relative to the vehicle seating position 30; or a collision state does not exist. For example, the inflatable airbag assembly 100 may be configured to prevent deployment if the utility component 110 is in a stowed configuration. Similarly, the inflatable airbag assembly 100 may be configured to prevent deployment if the utility component 110 is not securely locked in a use position.

The inflatable airbag cushion 130 is at least partially deployed, and at least partially inflated by action from an inflator 124a, 124b, or 124c (hereafter, generically referred to as "124x"). The inflator 124x may be mounted at the vehicle seating position 30. In one embodiment, the inflator 124a may be mounted at the seat base 34, for example, e.g., within, below, or adjacent the seat base 34. In one embodiment, the inflator 124b may be disposed at or within either the first support member (see the first support member 116 in FIG. 2) or the second support member 118. In one embodiment, the inflator 124b may be disposed at or within each of the first support member 116 and the second support member 118. In one embodiment, the inflator 124c may be disposed within the housing 120, or within or at the lateral member 112. In another embodiment, the inflatable airbag assembly 100 may comprise a plurality of inflators 124a, 124b, 124c. For the purposes of this disclosure, reference to "inflator 124x" represents any inflator 124a, 124b, 124c of the foregoing embodiments. A tube 126a and/or 126b may be coupled to the inflator 124x and the inflatable airbag cushion 130. The tube 126a and/or 126b is configured to deliver inflation gas from the inflator 124x to the inflatable airbag cushion 130 during deployment.

The inflator 124x may be activated as a result of a collision. Upon activation of the inflator 124x, inflation gas may be directed to the inflatable airbag cushion 130. Prior to inflation, the inflatable airbag cushion 130 may be rolled, folded, or otherwise disposed within the housing 120 (including in an embodiment wherein the lateral member 112 substantially constitutes the housing 120 and no distinct housing 120 is provided) in a compressed state. The inflatable airbag cushion 130 may comprise folds that unfold during deployment to deploy the inflatable airbag cushion 130 rearward and upward. In some embodiments, during inflation, inflation gas may be directed from the inflator 124x to the inflatable airbag cushion 130 via the tube 126a, 126b. More particularly, in an embodiment having an inflator 124a, the tube 126a may be routed from the inflator 124a through the seat base 34, then through either (or both) of the first support member 116 and the second support member 118, then through a portion of the lateral member 112 to the inflatable airbag cushion 130. In an embodiment having an inflator 124b, the tube 126b may be routed from the inflator 124b through a portion of the first and/or second support member 116, 118, then through a portion of the lateral member 112 to the inflatable airbag cushion 130. In an embodiment having an inflator 124c, the inflator 124c may be coupled directly to an inlet (not shown) of the inflatable airbag cushion 130, or may couple to the inflatable airbag cushion 130 via a short section of tube (not shown) routed from the inflator 124c to the inflatable airbag cushion 130.

When the inflator 124x is activated and inflation gas is delivered to the inflatable airbag cushion 130, the inflatable airbag cushion 130 begins to inflate, whereby the housing 120 (including in an embodiment wherein the lateral member 112 substantially constitutes the housing 120 and no distinct housing 120 is provided) may be either triggered (e.g., by an electrical signal) or forced open and the inflatable airbag cushion 130 deploys in a downward trajectory and curves around the utility component 110 in a rearward and upward trajectory. More particularly, an upper region 132 of the inflatable airbag cushion 130 deploys downward from the housing 120, then curves rearward and upward to be positioned between the utility component 110 and the seat 32 of the vehicle seating position 30. More particularly, the inflatable airbag cushion 130, in a deployed configuration, may be disposed between the utility component 110 and the seat base 34 of the vehicle seating position 30, and between the utility component 110 and the seatback 36 of the vehicle seating position 30. In other words, the inflatable airbag cushion 130, in a deployed configuration may be disposed between the utility component 110 and the occupant 50.

A lower region 138 of the inflatable airbag cushion 130 deploys downward and turns to deploy so as to be below the lateral member 112 of the utility component 110 and somewhat forward. Furthermore, as the inflatable airbag cushion 130 begins to expand, the lower region 138 may conform to the thighs/knees 58, 59 of the occupant 50 to dispose a side portion 139 of the lower region 138 adjacent the thighs/knees 58, 59 and between the thighs/knees 58, 59 and first and second support members 116, 118. In a deployed configuration, the inflatable airbag cushion 130 extends vertically from below the utility component 110 to above the utility component 110.

The inflatable airbag cushion 130 comprises a forward-facing panel 134 and an occupant-facing panel 136. The forward-facing panel 134 comprises a portion of the upper region 132 of the inflatable airbag cushion 130 facing forward relative to the vehicle, and may further comprise a portion of the lower region 138 of the inflatable airbag cushion 130 facing upward relative to the vehicle 10. The occupant-facing panel 136 comprises a rearward-facing (relative to the vehicle 10) portion of the upper region 132 and a downward-facing portion of the lower region 138 of the inflatable airbag cushion 130. In other words, the occupant-facing panel 136 of FIG. 3 comprises a contiguous portion of the inflatable airbag cushion 130 from an upper rear aspect of the upper region 132 downward thence forward to a lower forward aspect of the lower region 138 of the inflatable airbag cushion 130. During a collision event wherein the inflatable airbag assembly 100 is deployed, the occupant-facing panel 136 may receive or engage the head 52, torso 54, pelvic region 56, and thighs/knees 58, 59 of the occupant 50.

In one embodiment, the forward-facing panel 134 and the occupant-facing panel 136 may be formed of a single contiguous piece of appropriate material. In one embodiment, the forward-facing panel 134 may couple to the occupant-facing panel 136 by one or more seams generally about a perimeter of the inflatable airbag cushion 130, or at seams disposed rearward or forward of a perimeter of the inflatable airbag cushion 130. Seams may be formed by sewing, radio-frequency (RF) welding, adhesive, or any other appropriate means. The inflatable airbag cushion 130 may comprise gas-permeable seams, vents, ports, apertures, etc. configured to enable energy absorption during a collision event, while also permitting post-collision deflation of the inflatable airbag cushion 130.

Figure 4:
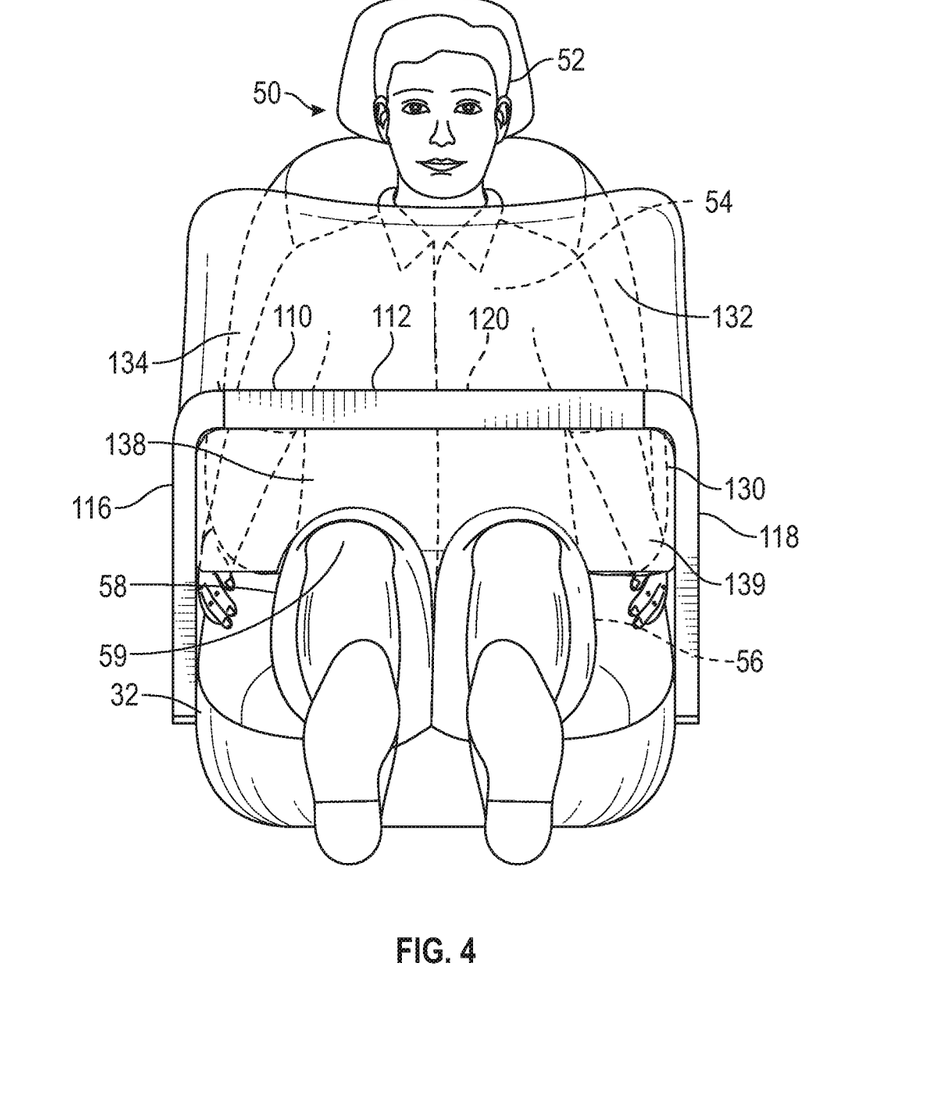
FIG. 4 is a front view of the inflatable airbag assembly of FIGS. 1A-1B and 2-3, with the inflatable airbag cushion at least partially deployed.

FIG. 4 is a front view of the inflatable airbag assembly 100 of FIGS. 1A-1B and 2-3, with the inflatable airbag cushion 130 at least partially deployed. The head 52, torso 54, pelvic region 56, and thighs/knees 58, 59 of the occupant 50, and the seat 32 are identified for reference. The first and second support members 116, 118 and lateral member 112 of the utility component 110 are shown. The inflatable airbag cushion 130 is at least partially inflated. The upper and lower regions 132, 138 of the inflatable airbag cushion 130, as well as the forward-facing panel 134, are shown. The inflatable airbag cushion 130 may be configured to deploy to receive and engage the head 52, torso 54, pelvic region 56, and thighs/knees 58, 59 of the occupant 50 during a collision event, and to dissipate collision energies of the occupant 50 to prevent or reduce injury to the occupant 50.

In a vehicle without the inflatable airbag assembly 100 of the present disclosure, during a collision event, the occupant 50 may be pushed, by collision energies, downward and forward, and may potentially "submarine" into the footwell 22, even if the occupant 50 is restrained by a harness (see the harness 40 in FIG. 1A). With the inflatable airbag assembly 100 of the present disclosure, as the occupant 50 engages the inflatable airbag cushion 130, the inflatable airbag cushion 130 may conform in response to energies of impact of the occupant 50 on the inflatable airbag cushion 130. The inflatable airbag cushion 130 may be drawn somewhat forward and downward but is limited by the fixed position of the utility component 110, and the occupant 50 may be substantially protected from "submarining" forward and downward into the footwell 22. In some collisions absent the inflatable airbag assembly 100 of the present disclosure, the occupant 50 may be forced upward and forward ("catapult" or "lift off"), potentially resulting in the occupant 50 colliding with a utility component (such as the utility component 110), a roof of the vehicle, or another structure of the vehicle, particularly if the occupant 50 is not restrained by a harness 40. In such a collision, the inflatable airbag cushion 130 may limit "catapult" movement of the occupant 50 to prevent or minimize injury resulting from the occupant 50 striking one or more vehicle structures, even if the occupant 50 is not restrained by a harness 40. In a variety of collision scenarios, the side portions 139 of the lower region 138 of the inflatable airbag cushion 130 may limit lateral movement of the thighs/knees 58, 59 of the occupant 50 to prevent or reduce injury resulting from striking the first and/or second support members 116, 118 or another vehicle structure. The inflatable airbag assembly 100 may provide substantial protection for an occupant 50 in a variety of collision scenarios, even if the occupant 50 is not restrained by a harness 40.

Figure 5:
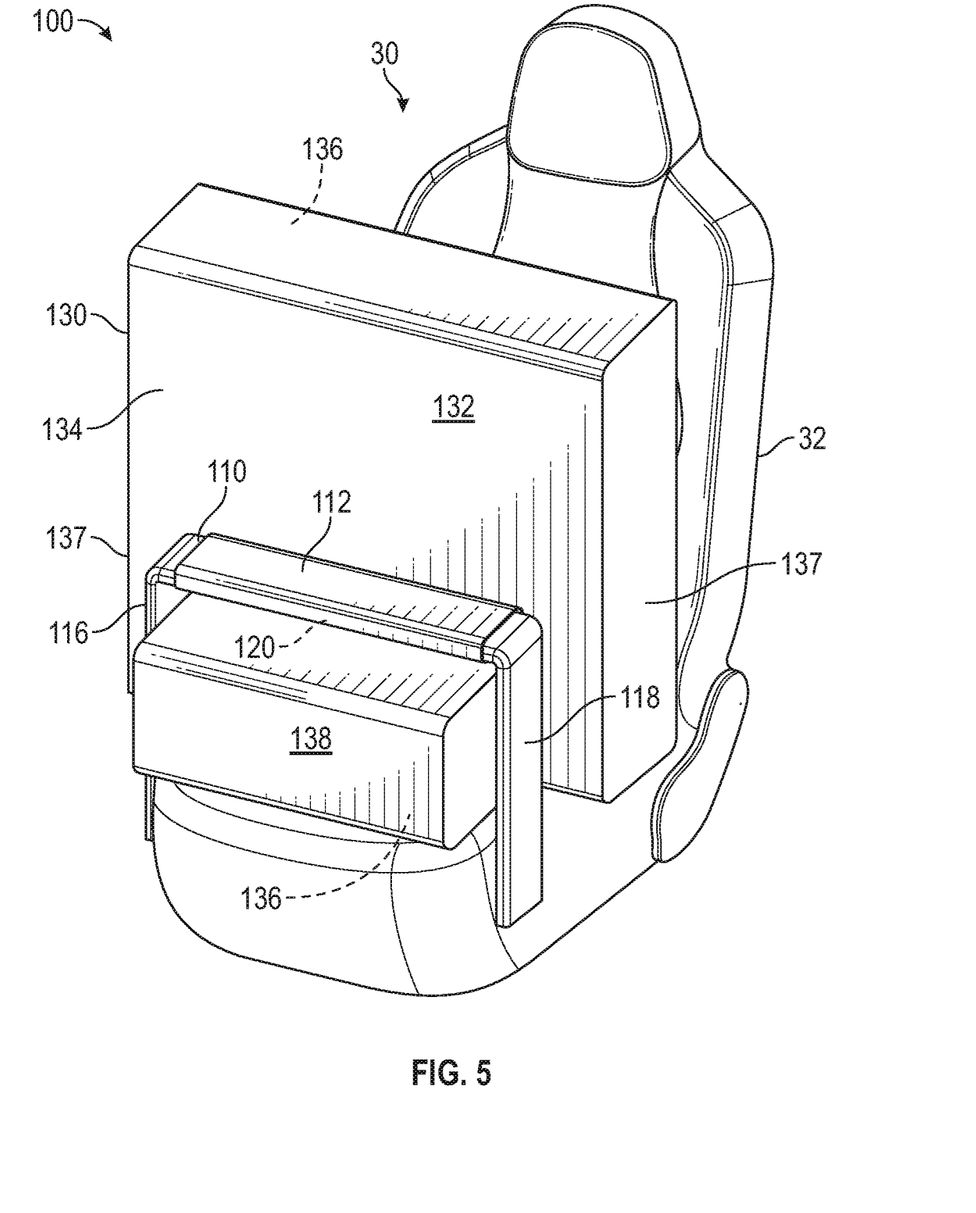
FIG. 5 is a perspective view of the inflatable airbag assembly of FIGS. 1A-1B and 2-4, with the inflatable airbag cushion at least partially deployed.

FIG. 5 is a perspective view of the inflatable airbag assembly 100 of FIGS. 1A-2B, and 2-4, with the inflatable airbag cushion 130 at least partially deployed. The vehicle seating position 30 and seat 32 are shown for reference. The utility component 110 is shown mounted to the seat base 34 of the seat 32; however, in another embodiment, the utility component 110 may be mounted to the seatback 36, to the floor (not shown) of the vehicle, to a console structure (not shown), or to another vehicle structure. The inflatable airbag cushion 130 deploys from the housing 120 with an initial downward trajectory and then curves to deploy rearward and upward, and also forward. More particularly, a portion of the inflatable airbag cushion 130, comprising the upper region 132, after initially deploying downward, curves and deploys upward and rearward to be disposed forward of an occupant (see the occupant 50 in FIGS. 3, 4) and generally rearward of the lateral member 112 of the utility component 110. Furthermore, the lower region 138, after deploying downward from the housing 120, curves and deploys forward.

A lateral portion 137 of the inflatable airbag cushion 130 may be disposed laterally outward relative to each of the first and second support members 116, 118. The lateral portions 137 may be particularly beneficial to protect the occupant 50 in an oblique impact collision scenario. In the embodiment of FIG. 5, the lateral portions 137 of the inflatable airbag cushion 130 extend approximately the full height of the inflatable airbag cushion 130. In another embodiment, the lateral portions 137 may extend vertically along only a portion of the height of the inflatable airbag cushion 130. In some embodiments, the inflatable airbag assembly 100 may be present with one or more other airbag assemblies. For example, in a vehicle having a side curtain airbag assembly, the inflatable airbag assembly 100 of this disclosure may omit or alter the lateral portion 137 disposed in the direction of the side curtain airbag assembly to prevent the two airbag assemblies from interfering with each other.

Figure 6:
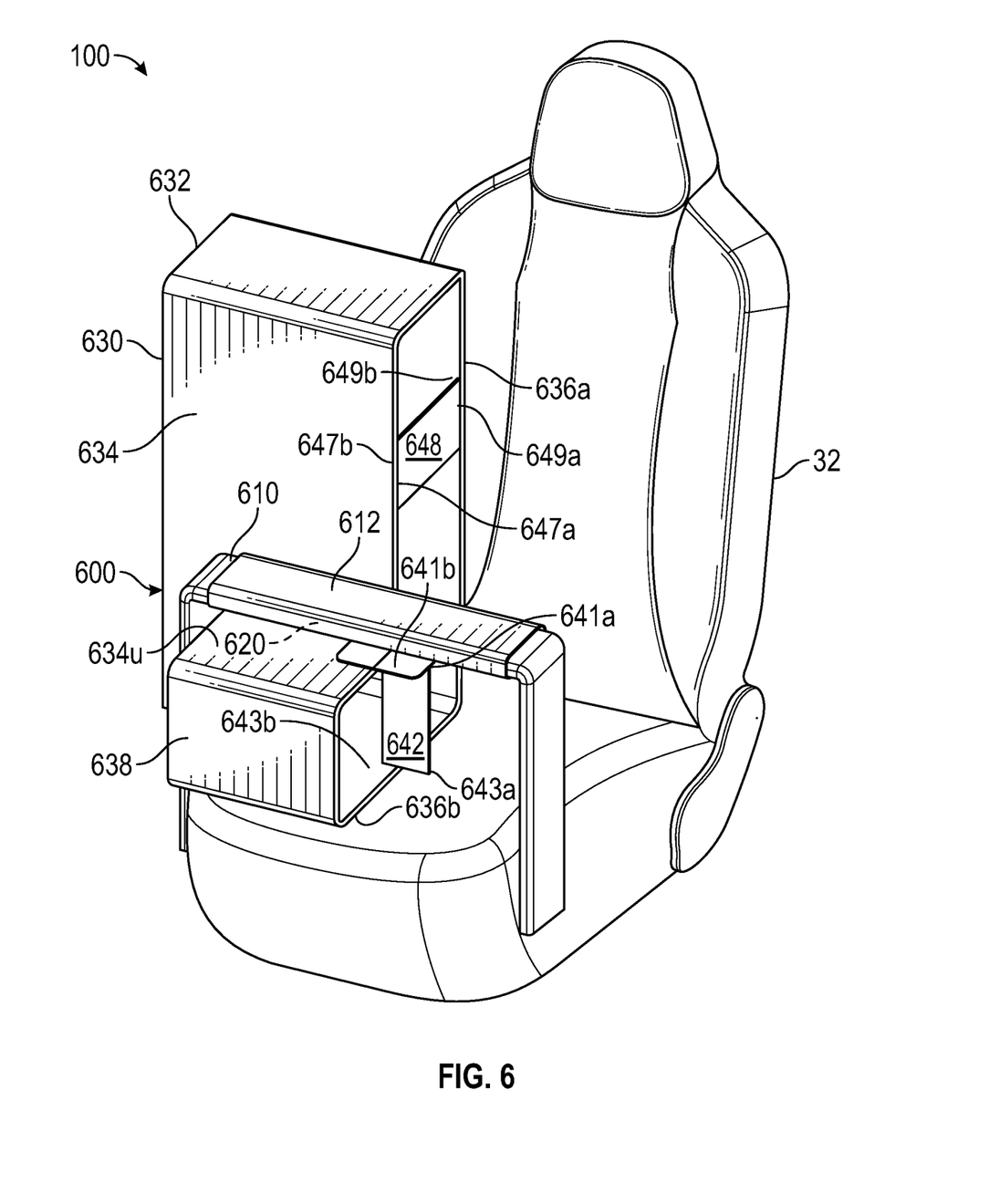
FIG. 6 is a partial cross-sectional perspective view of an inflatable airbag assembly, according to an embodiment of the present disclosure having a plurality of internal tethers.

FIG. 6 depicts another embodiment of an inflatable airbag assembly 600 that resembles the inflatable airbag assembly 100 described above in certain respects. Accordingly, like features are designated with like reference numerals, with the leading digits incremented to "6." For example, the embodiment depicted in FIG. 6 includes an inflatable airbag cushion 630 that may, in some respects, resemble the inflatable airbag cushion 130 of FIGS. 1A-1B and 2-5. Relevant disclosure set forth above regarding similarly identified features thus may not be repeated hereafter. Moreover, specific features of the inflatable airbag assembly 100 and related components shown in FIGS. 1A-1B and 2-5 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the inflatable airbag assembly 600 and related components depicted in FIG. 6. Any suitable combination of the features, and variations of the same, described with respect to the inflatable airbag assembly 100 and related components illustrated in FIGS. 1A-1B and 2-5 can be employed with the inflatable airbag assembly 600 and related components of FIG. 6, and vice versa. This pattern of disclosure applies equally to further embodiments depicted in subsequent figures and described hereafter, wherein the leading digits may be further incremented.

FIG. 6 is a partial cross-sectional perspective view of an inflatable airbag assembly 600 at least partially deployed, and having internal tethers 642, 648. A seat 32 is shown for reference. FIG. 6 illustrates the inflatable airbag assembly 600 having an inflatable airbag cushion 630 deployed from a housing 620 and at least partially inflated. The housing 620 is disposed within a utility component 610 or is integral to or otherwise provided by the utility component 610. The inflatable airbag cushion 630 comprises an upper region 632 and a lower region 638. The inflatable airbag cushion 630 further comprises a forward-facing panel 634, an occupant-facing panel upper region 636a, and an occupant-facing panel lower region 636b.

A first tether 642 is disposed within the lower region 638 of the inflatable airbag cushion 630. In one embodiment, the first tether 642 couples at a first end 641a to an anchor point 641b. The housing 620 or the utility component 610 may comprise the anchor point 641b, or the anchor point 641b may be a portion of an inner surface of an upward-facing area 634u of the forward-facing panel 634 of the lower region 638 of the inflatable airbag cushion 630. The first tether 642 couples at a second end 643a to an inner surface 643b of the occupant-facing panel lower region 636b. The second tether 648 may have a vertical dimension to limit downward expansion of the lower region 638 of the inflatable airbag cushion 630. Limiting downward expansion of the lower region 638 may promote forward expansion of the lower region 638 and lateral expansion of the lower region 638 to conform about knees/thighs of an occupant (see thighs/knees 58, 59 in FIGS. 3, 4). During deployment, the first tether 642 may be drawn taut and exert a force on the occupant-facing panel 636 to curve the occupant-facing panel 636a, 636b of the inflatable airbag cushion 630 rearward and upward.

A second tether 648 is disposed within the upper region 632. More particularly, the second tether 648 couples at a first end 647a to an inner surface 647b of the forward-facing panel 634, and at a second end 649a to an inner surface 649b of the occupant-facing panel upper region 636a. The first tether 648 may have a longitudinal dimension to limit rearward expansion of the upper region 632 of the inflatable airbag cushion 630. Limiting rearward expansion of the upper region 632 may promote upward deployment of the upper region 632, as well as assist in configuring the upper region 632 to receive and support a head, torso, and/or pelvic region (see head 52, torso 54, pelvic region 56 in FIGS. 3, 4) during a collision event.

In the embodiment shown in FIG. 6, a single first tether 642 and a single second tether 648 are shown. Furthermore, the first tether 642 is oriented with a vertical plane running in a lateral direction, and the second tether 648 is oriented with a vertical plane running in a longitudinal direction. In another embodiment, a plurality of first tethers 642 may be employed, a plurality of second tethers 648 may be employed, or both. Additionally, one or more first tethers 642 may be oriented in a different direction, and one or more second tethers 648 may be oriented in a different direction. By way of example, in one embodiment, there may be a first first tether 642 oriented laterally and a second first tether 642 oriented longitudinally such that the two first tethers 642 intersect or cross each other. Other configurations of the first and second tethers 642, 648 are anticipated by the present disclosure.

Figure 7:
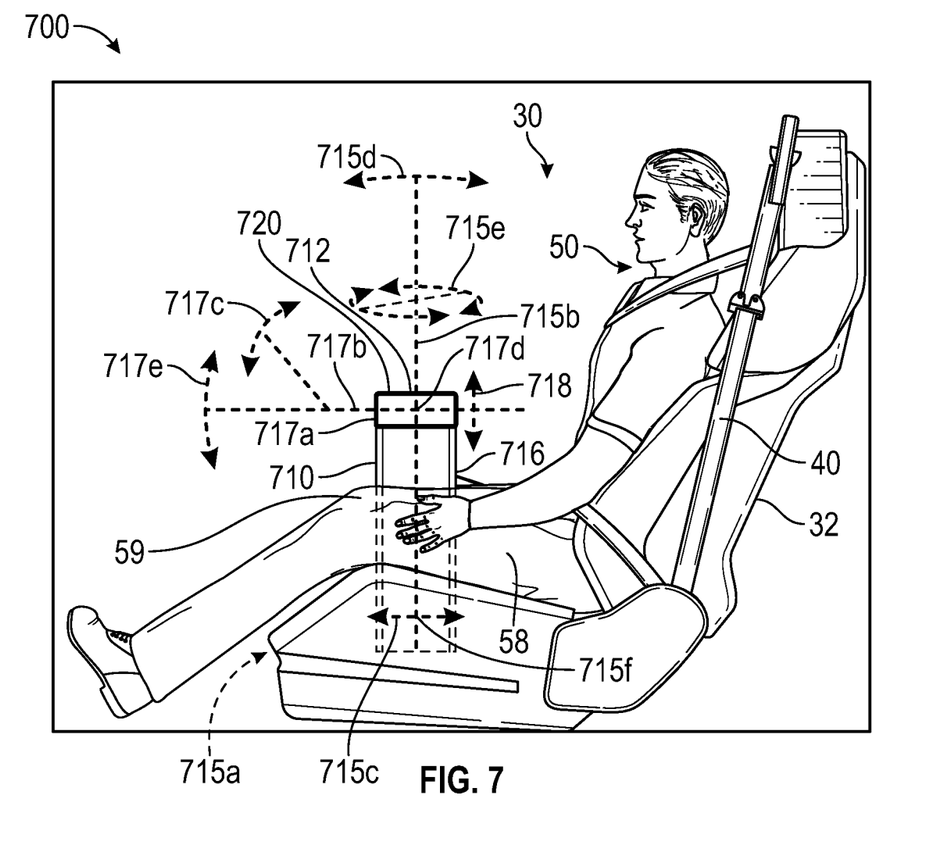
FIG. 7 is a side view of an inflatable airbag assembly, according to embodiments of the present disclosure having an articulable utility component.

FIG. 7 is a side view of an inflatable airbag assembly 700 wherein a utility component 710 is supported by a support member 716 on one side only. A seat 32 and an occupant 50 are shown for reference. The occupant 50 may be restrained by a harness 40. The utility component 710 comprises the support member 716 disposed toward one side of the vehicle seating position 30 and a lateral member 712. The lateral member 712 may constitute (e.g., serve as) or comprise (e.g., contain) a housing 720 to house one or more components of the inflatable airbag assembly 700.

The utility component 710 may be adjustable and/or stowable. For example, in one embodiment, the lateral member 712 may couple at the support member 716 via an articulable joint or hinge 717a whereby the lateral member 712 may pivot 717c about a longitudinal axis 717b of the vehicle, which may facilitate stowing and deploying the utility component 710. In one embodiment, the articulable joint or hinge 717a may permit the lateral member 712 to tilt 717e about a lateral axis 717d. In one embodiment, the lateral member 712 may be adjustable 718 in an upward and downward direction relative to the vehicle seating position 30. In one embodiment, the support member 716 may couple to the seat base 34 (or other vehicle component) via an articulable joint 715a. In one embodiment, the articulable joint 715a may permit fore and aft adjustment 715c of the utility component 710 relative to the vehicle seating position 30 to suit a particular occupant 50. In one embodiment, the articulable joint 715a may permit rotation 715e of the support member 716 (and, hence, the utility component 710) about a vertical axis 715b. In one embodiment, the articulable joint 715a may permit the support member 716 to rotate fore and aft about the articulable joint 715a such that support member 716 of the utility component 710 is rotatable 715d relative to the vehicle seating position 30 about an axis 715f that is transverse to a longitudinal axis of the vehicle in a longitudinal direction of the vehicle seating position 30. Articulations enabled by the articulable joint 715a and/or the articulable joint 717a may facilitate stowing the utility component 710 or lateral member 712 to permit ingress/egress to/from the vehicle seating position 30, and may facilitate deploying and positioning the utility component 710 for use by the occupant 50 of the vehicle seating position 30.

In any embodiment comprising the articulable joint 715a and/or the articulable joint 717a, each articulable joint 715a, 717a may be configured to lock into one or more predetermined positions. The utility component 710 may be configured to communicate to a sensor or onboard computer of the vehicle that each articulable joint 715a, 717a is locked in such a position. This communication may allow disablement of the inflatable airbag assembly 700 when any articulable joint 715a, 717a is not in a locked position.

Figure 8:
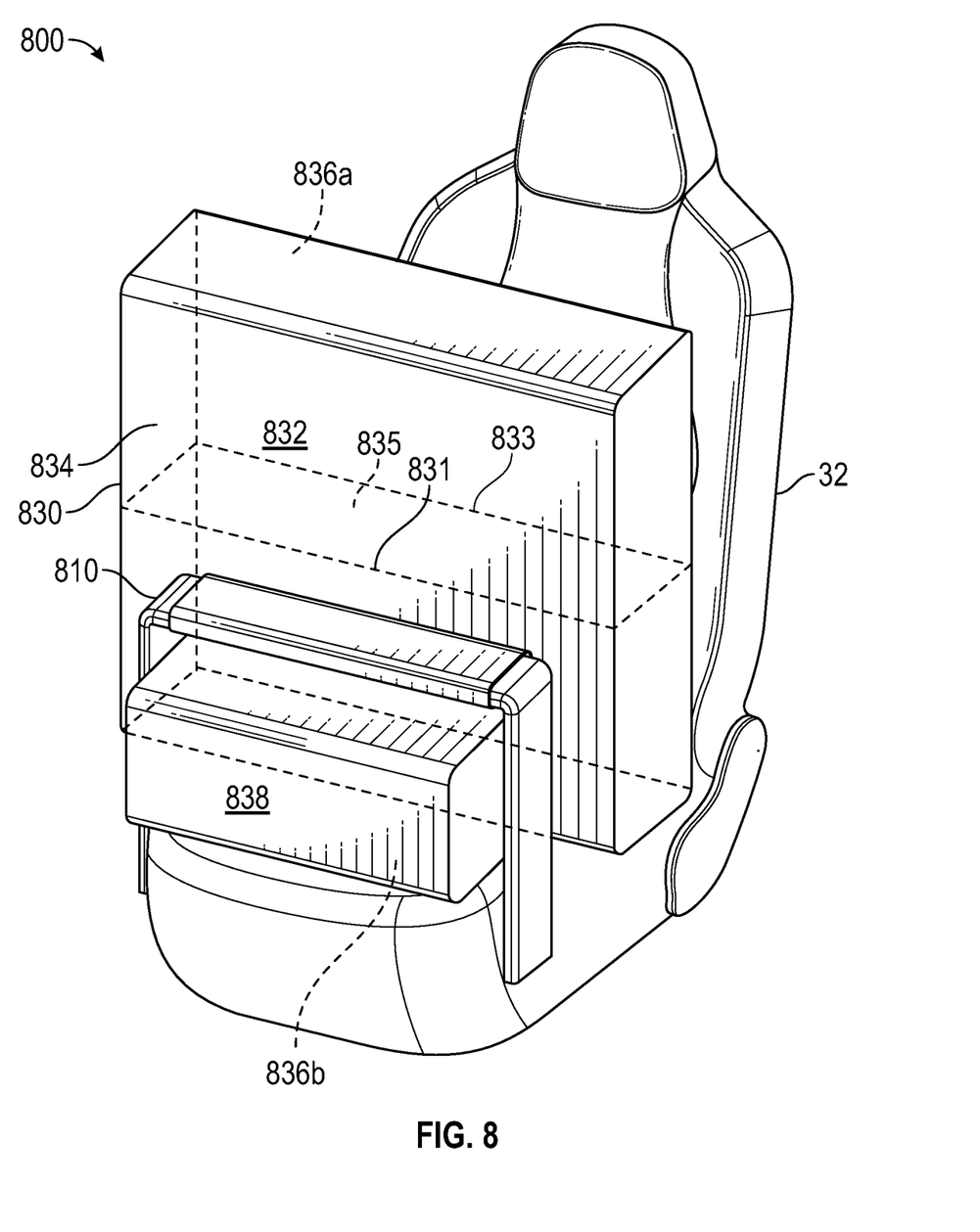
FIG. 8 is a perspective view of an inflatable airbag assembly, according to an embodiment of the present disclosure, having a multi-chamber inflatable airbag cushion.

FIG. 8 is a perspective view of an inflatable airbag assembly 800 having a multi-chamber inflatable airbag cushion 830. The seat 32 and a utility component 810 are shown for reference. The inflatable airbag cushion 830 comprises an upper chamber 832 and a lower chamber 838. In one embodiment, the upper chamber 832 and lower chamber 838 may be formed of a single contiguous portion of material (as by sewing, RF welding, adhesive, etc.) whereby a first seam 831 and a second seam 833 are formed, and whereby an interstitial member 835 is interposed between the upper and lower chamber 832, 838. In one embodiment, the upper and lower chambers 832, 838 are formed together of a single contiguous portion of material and the interstitial member 835 is coupled between the upper and lower chambers 832, 838 by the seams 831, 833. In one embodiment, the upper chamber 832 may be formed of a single contiguous portion of material, the second chamber 838 may be formed of another single contiguous portion of material, and the upper and lower chambers 832, 838 may then be coupled together at the first seam 831 and second seam 833, whereby the interstitial member 835 is formed of portions of both the upper and lower chambers 832, 838. Other methods of forming the distinct upper and lower chamber 832, 838 are anticipated by this disclosure.

When the inflatable airbag cushion 830 is deployed, the lower chamber 838 may deploy downward, a portion of the lower chamber 838 may curve rearward, and the upper chamber 832 may subsequently begin expanding. In one embodiment, when a preconfigured pressure is achieved within the lower chamber 838, the upper chamber 832 may expand upward from the lower chamber 838. In one embodiment, the inflatable airbag cushion 830 may be configured to inflate the upper chamber 832 following a fixed period of time after deployment of the inflatable airbag cushion 830 commences, whereby the lower chamber 838 is permitted to expand downward and rearward to at least a particular degree before the upper chamber 832 begins to inflate. In one embodiment, the inflatable airbag cushion 830 may be configured to begin inflating both the upper and lower chambers 832, 838 essentially simultaneously, but at different rates so that the upper chamber 832 expands more slowly and reaches full deployment a predetermined time after full deployment of the lower chamber 838. Other methods of differentiating the inflation of the upper and lower chambers 832, 838 are anticipated by this disclosure.

An embodiment having distinct upper and lower chambers 832, 838 may facilitate positioning of the upper chamber 832 to properly receive and support a head and/or torso of an occupant (see the head 52, torso 54, and occupant 50 in FIGS. 3, 4).

Figure 9:
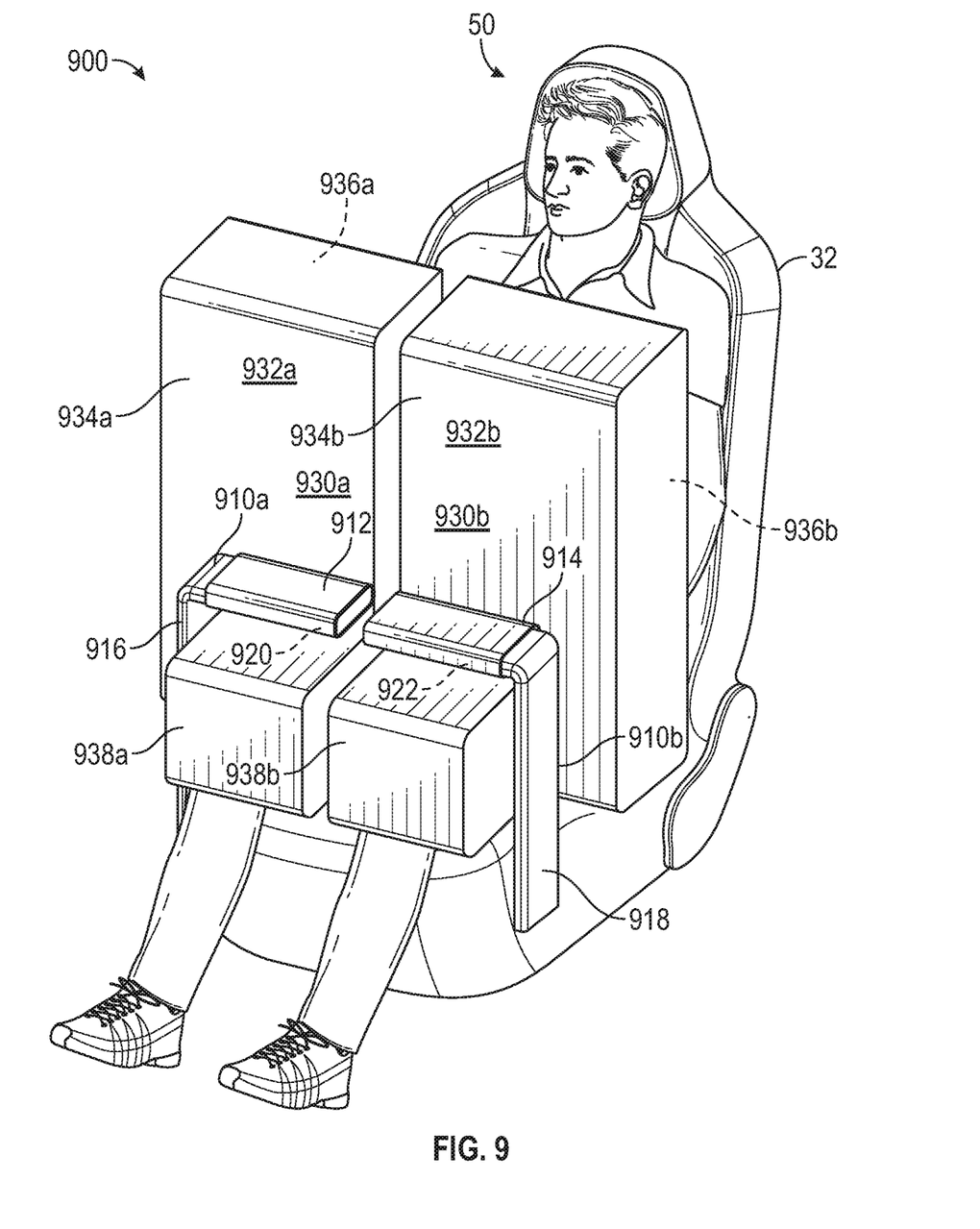
FIG. 9 is a perspective view of an inflatable airbag assembly, according to an embodiment of the present disclosure, having multiple inflatable airbag cushions.

FIG. 9 is a perspective view of an inflatable airbag assembly 900 having multiple inflatable airbag cushions 930a, 930b. The seat 32 and the occupant 50 are shown for reference. In the embodiment shown, a utility component system 910 comprises a first utility component 910a and a second utility component 910b. The first utility component 910a comprises a lateral member 912 and a support member 916. The second utility component 910b comprises a lateral member 914 and a support member 918. Each lateral member 912, 914 may constitute (serve as) or comprise (enclose) a housing 920, 922 of the inflatable airbag assembly 900.

When the inflatable airbag assembly 900 is activated with both the first and second utility components 910a, 910b properly positioned, a first inflatable airbag cushion 930a may deploy from the housing 920, and a second inflatable airbag cushion 930b may deploy from the housing 922. The first inflatable airbag cushion 930a comprises a first upper region 932a and a first lower region 938a. Similarly, the second inflatable airbag cushion 930b comprises a second upper region 932b and a second lower region 938b. The first and second upper regions 932a, 932b may be essentially analogous to upper region 132 of the inflatable airbag cushion 130 of FIGS. 3, 4. Likewise, the lower regions 938a, 938b may be essentially analogous to the lower region 138 of the inflatable airbag cushion 130 of FIGS. 3, 4. The first and second inflatable airbag cushions 930a, 930b may be analogous to other embodiments of the present disclosure. Furthermore, a gap is shown between the first and second utility components 910a, 910b, and between the first and second inflatable airbag cushions 930a, 930b. In one embodiment of the present disclosure, there is a lateral gap (as shown) between first and second utility components 910a, 910b when both the first and second utility components 910a, 910b are in use. In one embodiment, the first and second utility components 910a. 910b may couple such that there is no lateral gap.

Throughout this specification, "couples" (including couples to, couples at, couples with, etc.) refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one but not limited to one. For example, although the disclosure may recite an inflator having an initiator, the disclosure also contemplates that the inflator can have more than one initiator.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Elements recited in means-plus-function format are intended to be construed in accordance with 35 U.S.C. § 112(f). It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly comprising:
an inflatable airbag cushion to be disposed within a utility component that is partially disposed over a vehicle seating position, wherein the airbag cushion is configured to initially deploy from the utility component in a downward trajectory and curve around the utility component in a rearward and upward trajectory to be positioned between the utility component and a seat of the vehicle seating position;
an inflator configured to supply inflation gas to the airbag cushion during deployment; and
a tether with a first end coupled to an interior surface of an occupant-facing panel and a second end configured to couple to an anchor point of the utility component, the tether to extend vertically from the first end to the second end in a deployed configuration,
wherein the airbag cushion comprises a single inflatable chamber with a first portion that extends downward and forward from the utility component and a second portion that extends both downward from the utility component and rearward and upward from the utility component, and
wherein during deployment, the tether is drawn taut and exerts a force on the occupant-facing panel to curve the occupant-facing panel of the airbag cushion rearward and upward.

2. The airbag assembly of claim 1, further comprising a tube coupled to the inflator and the airbag cushion, wherein the tube is configured to supply inflation gas from the inflator to the airbag cushion during deployment.

3. The airbag assembly of claim 1, wherein the inflator is mounted in the vehicle seating position.

4. The airbag assembly of claim 1, wherein in the deployed configuration the airbag cushion is disposed between the utility component and a seat base of the seat of the vehicle seating position and between the utility component and a seatback of the seat of the vehicle seating position.

5. The airbag assembly of claim 1, wherein the airbag cushion, in the deployed configuration, extends vertically from below the utility component to above the utility component.

6. The airbag assembly of claim 1, wherein the airbag cushion comprises folds, wherein the folds of the airbag cushion unfold during deployment and deploy the airbag cushion rearward and upward.

7. An airbag assembly comprising:
an occupant accessory comprising:
a first arm coupled to a vehicle seating position on at least one lateral side of the vehicle seating position;
a utility component coupled to the arm configured to extend laterally over the vehicle seating position;
an airbag disposed within the utility component, wherein the airbag initially deploys in a downward trajectory and subsequently curves around the utility component between the utility component and a seatback of the vehicle seating position; and
a tether with a first end coupled to an interior surface of an occupant-facing panel and a second end coupled to an anchor point on the utility component, the tether extending vertically from the first end to the second end in a deployed configuration.

8. The airbag assembly of claim 7, wherein the utility component is movable between a stowed position and a use position, wherein, in the use position, the utility component is at least partially disposed over the vehicle seating position.

9. The airbag assembly of claim 7, wherein the first arm is rotatable relative to the vehicle seating position in a longitudinal direction of the vehicle seating position.

10. The airbag assembly of claim 7, wherein the utility component rotates relative to the first arm in a lateral direction away from the vehicle seating position.

11. The airbag assembly of claim 7, wherein the utility component is adjustable in an upward and downward direction relative to the vehicle seating position and in a fore and aft direction relative to the vehicle seating position.

12. The airbag assembly of claim 7, wherein the utility component comprises a cover on a bottom surface of the utility component, wherein the cover opens upon deployment of the airbag.

13. The airbag assembly of claim 7, wherein the occupant accessory further comprises a second arm connected to the vehicle seating position at an opposite lateral side of the vehicle seating position of the first arm, wherein the second arm is connected to the utility component and the utility component is configured to extend laterally across the vehicle seating position from the first arm to the second arm.

14. The airbag assembly of claim 7, wherein the occupant accessory further comprises a second arm connected to the vehicle seating position at an opposite lateral side of the vehicle seating position of the first arm, wherein the second arm is connected to a second utility component.

15. The airbag assembly of claim 14, wherein the airbag is disposed within the utility component and a second airbag is disposed within the second utility component, wherein the second airbag deploys in a downward trajectory and curves around the second utility component between the second utility component and the vehicle seating position.

16. The airbag assembly of claim 15, wherein the utility component is configured to extend from a lateral side of the vehicle seating position over the vehicle seating position and the second utility component is configured to extend from the opposite lateral side of the vehicle seating position over the vehicle seating position.

17. The airbag assembly of claim 7, further comprising an inflator disposed within the utility component.

18. The airbag assembly of claim 7, further comprising an inflator to be mounted within a seat of the vehicle seating position and a tube disposed within the first arm, wherein the tube couples the inflator to the airbag, wherein inflation gas is supplied to the airbag from the inflator via the tube.

* * * * *